(12) United States Patent
Kohoutek

(10) Patent No.: US 12,406,261 B2
(45) Date of Patent: Sep. 2, 2025

(54) UNSUPERVISED CLUSTERING FEATURE ENGINEERING

(71) Applicant: Early Warning Services, LLC, Scottsdale, AZ (US)

(72) Inventor: Jack Kohoutek, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 0 days.

(21) Appl. No.: 17/903,441

(22) Filed: Sep. 6, 2022

(65) Prior Publication Data

US 2023/0079513 A1 Mar. 16, 2023

Related U.S. Application Data

(60) Provisional application No. 63/243,674, filed on Sep. 13, 2021.

(51) Int. Cl.
*G06Q 20/40* (2012.01)
*G06F 18/214* (2023.01)
*G06F 18/23213* (2023.01)
*G06N 20/00* (2019.01)

(52) U.S. Cl.
CPC ....... *G06Q 20/4016* (2013.01); *G06F 18/214* (2023.01); *G06F 18/23213* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 7,912,773 B1 * | 3/2011 | Subramanian | G06Q 40/03 705/35 |
| 7,970,701 B2 * | 6/2011 | Lewis | G06Q 20/4016 705/38 |
| 9,516,053 B1 * | 12/2016 | Muddu | G06F 16/9024 |
| 11,282,086 B1 * | 3/2022 | Medina, III | G06K 7/1413 |
| 2014/0143251 A1 * | 5/2014 | Wang | G06F 16/285 707/737 |
| 2015/0073981 A1 * | 3/2015 | Adjaoute | G06Q 20/384 705/39 |
| 2020/0364586 A1 * | 11/2020 | Sampaio | G06N 5/01 |
| 2022/0148001 A1 * | 5/2022 | Rafferty | G06N 3/08 |

FOREIGN PATENT DOCUMENTS

WO WO1995024016 A1 * 9/1995 ............. G06V 30/36

* cited by examiner

*Primary Examiner* — Peter D Nolan
*Assistant Examiner* — Matthew Cobb
(74) *Attorney, Agent, or Firm* — Kilpatrick Townsend & Stockton LLP

(57) ABSTRACT

A method of generating an input for a machine learning algorithm may include collecting data records. Each data record may include a plurality of categories of data. The method may include using vector quantization to partition the plurality of data records into a plurality of groupings. Each of the groupings may be based on one or more of the plurality of categories of data. The method may include generating a correlation score for each of the plurality of groupings. The correlation score may be indicative of whether a particular group is indicative of a given outcome.

21 Claims, 4 Drawing Sheets

FIG. 3

| Check | Serial Number | Amount | Number of checks cased in last 5 months | Number of checks issued in last 5 | Check Counterfeit? | Grouping 1 | Grouping 2 | Grouping 3 |
|---|---|---|---|---|---|---|---|---|
| 1 | 955 | 35.17 | 10 | 3 | Yes | 3 | 2 | 1 |
| 2 | 401 | 93.84 | 6 | 9 | No | 2 | 4 | 4 |
| 3 | 434 | 77.12 | 7 | 4 | No | 2 | 4 | 3 |
| 4 | 440 | 68.73 | 7 | 10 | No | 2 | 4 | 4 |
| 5 | 209 | 36.43 | 5 | 7 | No | 1 | 2 | 2 |
| 6 | 650 | 3.8 | 7 | 9 | No | 3 | 3 | 2 |
| 7 | 262 | 84.35 | 2 | 2 | Yes | 2 | 3 | 3 |
| 8 | 685 | 35.34 | 6 | 0 | No | 3 | 2 | 1 |
| 9 | 333 | 14.31 | 0 | 5 | Yes | 1 | 1 | 1 |
| 10 | 961 | 12.02 | 7 | 1 | No | 3 | 2 | 3 |
| 11 | 665 | 60.1 | 8 | 2 | No | 4 | 4 | 4 |
| 12 | 89 | 54 | 10 | 10 | No | 2 | 4 | 3 |
| 13 | 815 | 84.31 | 9 | 3 | No | 4 | 4 | 1 |
| 14 | 977 | 5.17 | 5 | 1 | Yes | 3 | 1 | 3 |
| 15 | 168 | 87.78 | 7 | 4 | Yes | 2 | 4 | 1 |
| 16 | 62 | 76.91 | 6 | 3 | No | 4 | 4 | 3 |
| 17 | 735 | 54.98 | 6 | 1 | No | 4 | 4 | 3 |
| 18 | 542 | 40.63 | 5 | 2 | No | 3 | 3 | 3 |
| 19 | 314 | 53.8 | 7 | 6 | No | 2 | 1 | 1 |
| 20 | 924 | 60.45 | 7 | 5 | No | 4 | 4 | 4 |
| 21 | 908 | 32.44 | 7 | 5 | Yes | 4 | 4 | 3 |
| 22 | 141 | 6.59 | 7 | 8 | No | 3 | 2 | 1 |
| 23 | 305 | 34.14 | 2 | 7 | No | 1 | 1 | 2 |
| 24 | 945 | 35.05 | 5 | 0 | No | 1 | 1 | 1 |
| 25 | 505 | 96.87 | 9 | 9 | No | 3 | 4 | 4 |
| 26 | 36 | 96.4 | 7 | 7 | Yes | 4 | 4 | 4 |
| 27 | 707 | 59.6 | 9 | 1 | Yes | 2 | 2 | 3 |
| 28 | 769 | 54.8 | 10 | 1 | No | 4 | 4 | 3 |
| 29 | 75 | 97.33 | 7 | 5 | No | 2 | 4 | 3 |
| 30 | 603 | 36.12 | 0 | 5 | No | 3 | 3 | 3 |
| 31 | 640 | 11.27 | 4 | 3 | No | 3 | 1 | 1 |
| 32 | 360 | 41.83 | 9 | 8 | Yes | 1 | 2 | 2 |

UNSUPERVISED CLUSTERING FEATURE ENGINEERING

CROSS-REFERENCE TO RELATED APPLICATIONS

This application claims the benefit of U.S. Provisional Application Ser. No. 63/243,674, filed on Sep. 13, 2021, entitled "UNSUPERVISED CLUSTERING FEATURE ENGINEERING", the disclosure of which is incorporated by reference herein in its entirety.

BACKGROUND OF THE INVENTION

Machine learning algorithms for predicting whether data records match a particular outcome are used in various fields to provide additional information that may facilitate more well-informed decision making. However, typically the input features for the machine learning algorithms are generated by humans, and may therefore be limited in breadth and level of granularity based on the time constraints and pattern recognition abilities of human users. Therefore, improvements in the generation of input features and the training of machine learning algorithms are desired.

BRIEF SUMMARY OF THE INVENTION

Embodiments of the present invention are directed to systems and methods for generating input features that are usable by machine learning algorithms to predict whether a particular data record is likely to match a particular outcome. Embodiments may utilize unsupervised vector quantization algorithms to partition data records into a number of groupings that are each made up of a number of subgroups. Each subgroup may then be assigned a correlation score that is indicative of how predictive each subgroup is of a data record within the subgroup matching a particular outcome. Embodiments may use such algorithms to generate predictive input features without human intervention.

One aspect of the disclosure provides for a method of generating an input for a machine learning algorithm, using one or more processors. The method may include: collecting a plurality of data records, wherein each data record comprises a plurality of categories of data; using vector quantization to partition the plurality of data records into a plurality of groupings, wherein each of the plurality of groupings is based on one or more of the plurality of categories of data; generating a correlation score for each of the plurality of groups, wherein the correlation score is indicative of whether a particular subgroup of the plurality of groups is indicative of a given outcome; and providing, based on the correlation score, at least one of the plurality of groups to a computing device storing a machine learning algorithm that identifies whether a particular data record is likely to be associated with the given outcome. The at least one of the plurality of groupings may comprise at least one subgroup having a correlation score that meets or exceeds a predetermined threshold score. The at least one of the plurality of groupings may comprise a predetermined number of at least one subgroup having correlation scores that are highest. The at least one of the plurality of groupings may comprise a predetermined percentage of at least one subgroup having correlation scores that are highest. The method may further comprise determining how different in value each data record of the plurality of data records is from an average data record within a particular subgroup associated with the data record. Generating the correlation score may comprise passing the plurality of groupings into a mutual information scoring algorithm. The vector quantization may comprise a k-means clustering algorithm. Collecting the plurality of data records may include collecting a plurality of checks from one or more financial institutions and the correlation score may be indicative of whether a particular subgroup of checks of the plurality of checks is indicative of a given outcome. The correlation score for a particular group of checks of the plurality of checks may be based at least partially on whether any checks within the particular subgroup of checks are fraudulent.

Another aspect of the disclosure provides for a system, including one or more computing devices, and memory storing instructions, the instructions being executable by the one or more computing devices, wherein the one or more computing devices are configured to: collect a plurality of data records, wherein each data record comprises a plurality of categories of data; using vector quantization to partition the plurality of data records into a plurality of groupings, wherein each of the plurality of groupings is based on one or more of the plurality of categories of data; generating a correlation score for each of the plurality of groups, wherein the correlation score is indicative of whether a particular subgroup of the plurality of groups is indicative of a given outcome; and providing, based on the correlation score, at least one of the plurality of groups to a computing device storing a machine learning algorithm that identifies whether a particular data record is likely to be associated with the given outcome. The at least one of the plurality of groupings may comprise at least one subgroup having a correlation score that meets or exceeds a predetermined threshold score. Generating the correlation score may comprise passing the plurality of groupings into a mutual information scoring algorithm. The vector quantization may comprise a k-means clustering algorithm. Collecting the plurality of data records may include collecting a plurality of checks from one or more financial institutions and the correlation score may be indicative of whether a particular subgroup of checks of the plurality of checks is indicative of a given outcome. The correlation score for a particular group of checks of the plurality of checks may be based at least partially on whether any checks within the particular subgroup of checks are fraudulent.

A yet further aspect of the disclosure provides for a non-transitory computing-device readable storage medium on which computing-device readable instructions of a program are stored, the instructions, when executed by one or more computing devices, causing the one or more computing devices to perform a method, comprising: collecting a plurality of data records, wherein each data record comprises a plurality of categories of data; using vector quantization to partition the plurality of data records into a plurality of groupings, wherein each of the plurality of groupings is based on one or more of the plurality of categories of data; generating a correlation score for each of the plurality of groups, wherein the correlation score is indicative of whether a particular subgroup of the plurality of groups is indicative of a given outcome; and providing, based on the correlation score, at least one of the plurality of groups to a computing device storing a machine learning algorithm that identifies whether a particular data record is likely to be associated with the given outcome. Generating the correlation score may comprise passing the plurality of groupings into a mutual information scoring algorithm. The vector quantization may comprise a k-means clustering algorithm. Collecting the plurality of data records may include collecting a plurality of checks from one or more financial institutions and the correlation score may be indicative of whether a particular subgroup of checks of the plurality of checks is indicative of a given outcome. The correlation score for a particular group of checks of the plurality of checks may be based at least partially on whether any checks within the particular subgroup of checks are fraudulent.

BRIEF DESCRIPTION OF THE DRAWINGS

FIG. 3 illustrates sample data for generating input features for a machine learning algorithm according to an embodiment of the present invention.

DETAILED DESCRIPTION OF THE INVENTION

Embodiments of the present invention are directed to techniques for automatically creating features for use in machine learning algorithms using unsupervised clustering techniques. In particular, embodiments may be used to generate input features that are used by machine learning algorithms. In some embodiments, the machine learning algorithms may be used by financial institutions and/or other entities to generate financial determinations, such as credit risk and lending decisions, fraud determination decisions, counterfeit check determinations, and the like. In some embodiments, the input features may be associated with a correlation score that is representative of how likely a particular feature (or group of features) is associated with a given outcome. Use of such correlation scoring may further improve the ability of the machine learning algorithm to generate more accurate outcomes by filtering out unhelpful data and relying only on the most predictive data groupings when generating a given determination. In particular, the use of unsupervised clustering and correlation scoring techniques creates useful data features that could not practically be created by humans using the same data. Such features lend themselves to strengthening the performance of the machine learning algorithms by improving the speed at which machine learning models are trained using these algorithms. The algorithms described herein may use distance formulas to compare the data records and group the data records into clusters (groupings and, in some embodiments, subgroups within that grouping) and may filter out unhelpful data from the grouped clusters. While discussed largely in the context of financial determinations, it will be appreciated that the clustering and scoring techniques described herein may be utilized to generate more accurate input features for machine learning algorithms in any other application.

Figure 1:
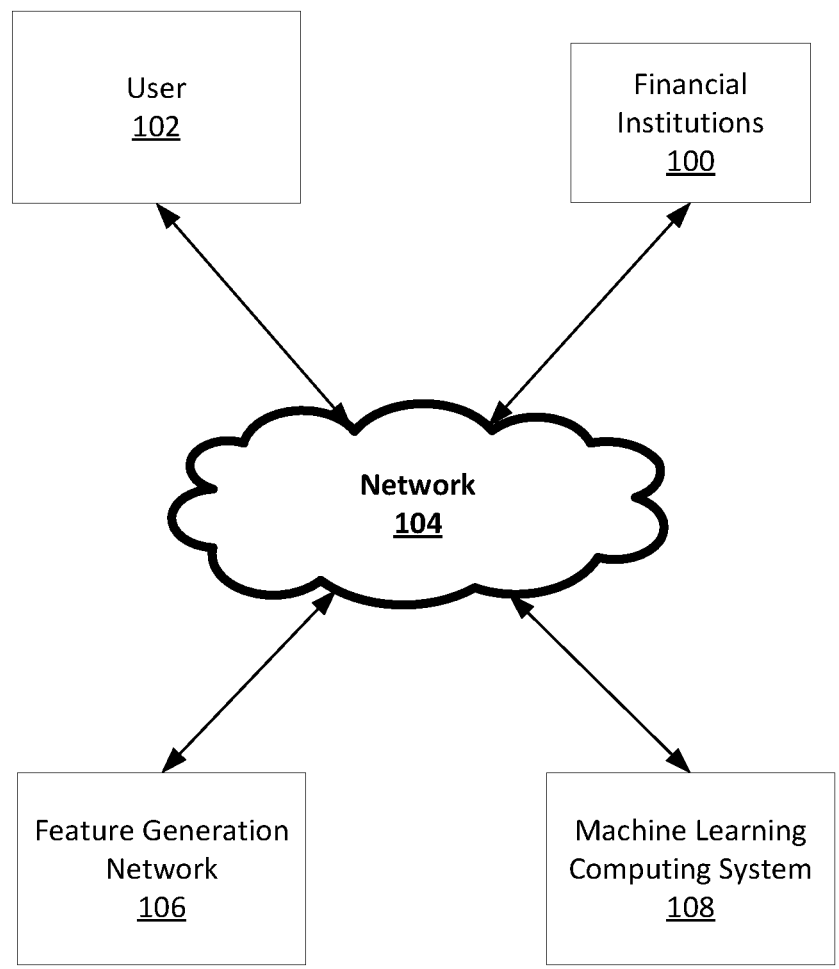
FIG. 1 illustrates a system for generating machine learning input features according to an embodiment of the present invention.

Turning now to FIG. 1, a system for generating machine learning features is illustrated. The system may include one or more financial institutions 100. The financial institutions 100 may be banks, credit unions, brokerage firms, credit card issuers, and/or other entities that service financial accounts for consumers and/or businesses. Financial institutions 100 may also encompass other entities that may operate financial accounts (including issuing and cashing checks and/or other negotiable instruments), offering lending and/or other financing options, and/or otherwise handle financial transactions. Each financial institution 100 may include one or more computing systems that facilitate interactions with users and/or back-end systems. The financial institutions 100 may each maintain records not only of balances associated with each account, but may also maintain records of transactions (e.g., debits and credits) associated with the various accounts, records of checks and/or other negotiable instruments (issued and/or cashed), and/or maintain records of other financial data associated with one or more users.

The system may include a number of users 102 that may interact with one or more of the financial institutions 100. For example, the users 102 may maintain one or more financial accounts (e.g., checking accounts, savings accounts, credit card accounts, brokerage accounts, cryptocurrency accounts, etc.) at one or more of the financial institutions 100. Additionally, the users 102 may apply for loans/credit/financing, cash/deposit/issue checks, initiate transfers to and/or from one or more financial accounts, and/or otherwise interact with one or more of the financial institutions 100. The users 102 may be individuals and/or business entities. The users 102 may interact with the financial institutions 100 in person at brick and mortar locations and/or using one or more user devices that communicate with the financial institutions 100 via one or more wired and/or wireless networks 104. The user devices may include mobile phones, tablet computers, personal computers, e-readers, and the like. In some embodiments, the user devices may include computing devices, such as point of sale devices, that may be positioned at brick-and-mortar locations of a given financial institution 100. The users may use these computing devices to interact with a given financial institution 100. The user devices may access the financial institution 100 via software applications and/or websites that are associated with and/or operated by a given financial institution 100 and that provide user interfaces that enable the users to manage accounts, conduct transactions, and/or apply for funds from the financial institution 100.

The system may include a feature generation network 106, which may be in communication with the financial institutions 100, user devices and/or users 102 via the one or more networks 104. The feature generation network 106 may establish relationships with any number of financial institutions 100, which may enable the feature generation network 106 to access data records (such as detailed account and/or transaction data) associated with each financial account and/or user 102 from the users 102 who consented to provide such data records. The feature generation network 106 may access and aggregate the data records from each of the financial accounts identified as being associated with one or more users 102 (e.g., payee and/or payor). This data may be parsed to identify inflow and outflow transactions associated with each financial account. The feature generation network 106 may use this data to automatically generate input features that may be supplied to a machine learning computing system 108 (which may or may not be part of and/or operated by the feature generation network 106) that identifies whether a particular data record (such as a check or other negotiable instrument, loan/credit application, transaction, account information, etc.) is likely to be associated with a given outcome (e.g., a fraudulent/counterfeit check, loan/credit default, non-payment, etc.).

The feature generation network 106 may analyze the data records to identify one or more categories of data contained within the data records, and may group the data records based on having similar values for one or more of the categories. In some embodiments, the feature generation network 106 may use vector quantization, such as a k-means clustering algorithm, to partition the plurality of data records into a plurality of groups (e.g., a grouping of data and, in some embodiments, subgroups of data within that grouping). For example, the feature generation network 106 may analyze a group of checks and/or other related data received from one or more of the financial institutions 100 to generate input features for the machine learning computing system 108, with the input features providing some indication of whether a check having certain characteristics is likely to be counterfeit and/or otherwise fraudulent. For example, the feature generation network 106 may access data associated with each check (such as, but not limited to, a serial number of a check and/or an amount of the check) and/or data related to a user 102 who is associated with the check (such as, but not limited to, a number of checks cashed by the user 102 (payor and/or payee) over a given time period, and a number of checks issued by the user 102 (payor and/or payee) over the given time period).

The feature generation network 106 may input the various data associated with each of the checks into a k-means clustering algorithm (or other vector quantization algorithm), which may partition the various checks into a number of different groups based on one or more types (or categories) of data associated with the check and/or user, with the checks in each group having similar characteristics of the various data categories (serial number, amount, user history, etc.). The k-means clustering algorithm may be executed any number of times to partition the checks into any number of groups.

After grouping the checks, information associated with whether any of the checks were known to be fraudulent and/or counterfeit may be used to generate a correlation score for each group of checks. For example, each of the groups may be passed to a mutual information scoring algorithm, along with data related to whether any of the checks are known to be fraudulent and/or counterfeit. The mutual information scoring algorithm may generate a correlation score based on this information that indicates whether a check falling into a particular group is likely to be fraudulent and/or counterfeit. Some or all of the groups and the associated correlation scores may then be provided to the machine learning computer system 108 for use as inputs for a machine learning algorithm that determines whether a check having certain characteristics is likely to be counterfeit and/or otherwise fraudulent.

Figure 2:
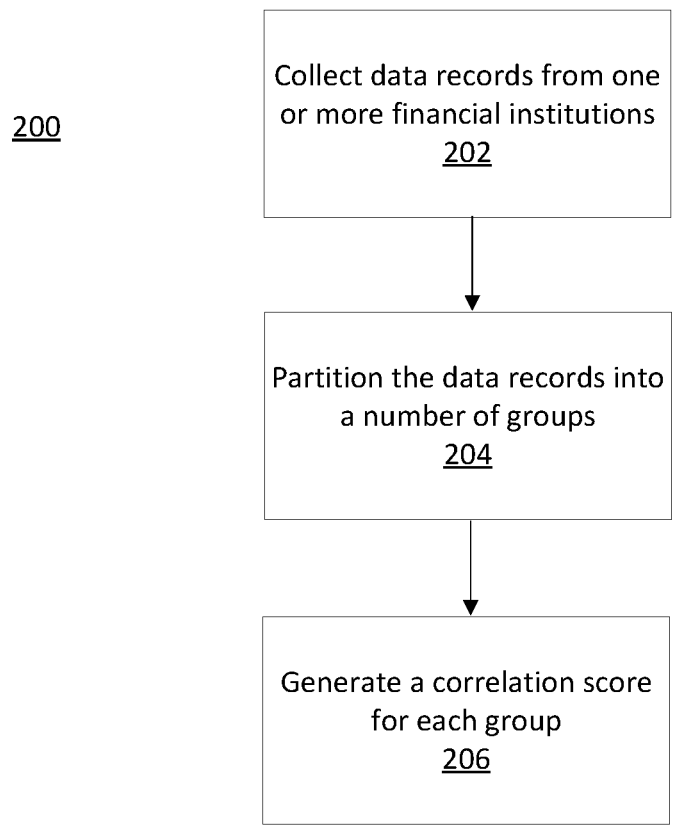
FIG. 2 is a flowchart illustrating a process for generating an input for a machine learning algorithm according to an embodiment of the present invention.

FIG. 2 is a flowchart illustrating a process 200 of generating an input for a machine learning algorithm according to an embodiment of the present invention. Process 200 may be performed by a user financial institution 100 and/or the feature generation network 106. Process 200 will be discussed in conjunction with FIG. 3, which illustrates sample data for generating input features for a machine learning algorithm. The sample data illustrated in FIG. 3 relates to fraud/counterfeit check input features, however it will be appreciated that any sample data may be processed in a similar manner to generate input features for any type of machine learning algorithm. Process 200 may begin at operation 202 by collecting data records 300 from one or more financial institutions and/or other entities, with each data record including a plurality of categories of data. As just one example, the data records may include checks and/or data related a user associated with a given check. In such embodiments, the categories of data may include a serial number of the check 302, an amount of the check 304, a number of checks cashed by a user associated with the check over a given time period (e.g., in the last five months) 306, a number of checks issued by the user associated with the check over the given time period 308 (e.g., in the last five months), and/or other relevant information.

At operation 204, the data records may be partitioned into a number of groups, with each of the groups being based on one or more categories of data. This may be done one or more times, to form overall groupings of one or more groups. For example, as illustrated in FIG. 3, a first grouping 312 may be generated based on a combination of the serial number of the check 302 and the amount of the check 304. A first subgroup within the first grouping 312 may include checks that have serial numbers between 1 and 500 and with amounts of less than or equal to $50, a second subgroup within the first grouping 312 may include checks having serial numbers between 1 and 500 and with amounts of greater than $50, a third subgroup within the first grouping 312 may include checks that have serial numbers between 501 and 1000 and with amounts of less than or equal to $50, and a fourth subgroup within the first grouping 312 may include checks that have serial numbers between 501 and 1000 and with amounts of greater than $50.

The checks may be partitioned again to form a second grouping 314 based on an amount of the check 304 and a number of checks cashed by a user associated with the check over a given time period 306. A first subgroup within the second grouping 314 may have amounts of less than or equal to $50 and a number of checks cashed by a user associated with the check over a given time period of less than 6 checks, a second subgroup within the second grouping 314 may have amounts of less than or equal to $50 and a number of checks cashed by a user associated with the check over a given time period of greater than 5 checks, a third subgroup within the second grouping 314 may have amounts of greater than $50 and a number of checks cashed by a user associated with the check over a given time period of less than 6 checks, and a fourth subgroup within the second grouping 314 may have amounts of greater than $50 and a number of checks cashed by a user associated with the check over a given time period of greater than 5 checks.

The checks may be partitioned again to form a third grouping 316 based on an amount of the check 304 and a number of checks issued by a user associated with the check over a given time period 308. A first subgroup within the third grouping 316 may have amounts of less than or equal to $50 and a number of checks issued by a user associated with the check over a given time period of less than 6 checks, a second subgroup within the third grouping 316 may have amounts of less than or equal to $50 and a number of checks issued by a user associated with the check over a given time period of greater than 5 checks, a third subgroup within the third grouping 316 may have amounts of greater than $50 and a number of checks issued by a user associated with the check over a given time period of less than 6 checks, and a fourth subgroup within the third grouping 316 may have amounts of greater than $50 and a number of checks issued by a user associated with the check over a given time period of greater than 5 checks.

Each time the checks are partitioned into subgroups within a larger grouping, every check is assigned to one of the respective subgroups. Therefore, if the checks are partitioned based on three different, larger groupings of different categories of data, each check will be assigned to one subgroup within each grouping such that each check belongs to the three larger, distinct groupings. While shown with three groupings that are each based on two categories of data, it will be appreciated that any number of groupings based on any combination of one or more categories of data may be used in various embodiments. The groupings may each be based on a same number of categories of data as shown here. In other embodiments, some or all of the groupings may be based on different numbers of categories of data. Additionally, while shown with each grouping being made of four subgroups, it will be appreciated that any number of subgroups may be utilized in various embodiments and that in some embodiments the number of subgroups may vary from grouping to grouping. Further, each subgroup is not limited to the specific divisions within the larger groupings (i.e., the size of the dollar amount and time period) as noted in the above examples and may be based on any number of means of dividing the larger groupings into each subgroups that is tailored for each type of particular data.

The partitioning of the data records may be performed automatically, such as by using vector quantization techniques. In a particular embodiment, the partitioning of the data records may be performed using a k-means clustering algorithm, which may automatically generate the various groupings when the data records and/or categories of data are provided as inputs to the algorithm. Using unsupervised k-means clustering techniques, once the data records and/or categories of data are provided as inputs, the algorithm may generate any number of groupings having any number of subgroups.

After being grouped, a correlation score may be generated for each of the subgroups of data records at operation 206. The correlation score may be indicative of whether a particular subgroup is indicative of a given outcome. For example, with the check embodiment shown in FIG. 3, the correlation score may be indicative of whether characteristics associated with a given subgroup of checks (such as the third subgroup of the first grouping 312, checks having serial numbers between 501 and 1000 and with amounts of less than or equal to $50) are likely to result in a given check being fraudulent and/or counterfeit. This may involve factoring in how many of the checks within a given subgroup are known to be fraudulent or counterfeit 310. In some embodiments, the correlation score may be generated by passing each subgroup of checks (along with information related to how many checks within each subgroup are known to be fraudulent or counterfeit 310) into a mutual information scoring algorithm. In some embodiments, in addition to the correlation scores, additional metrics may be generated for each check and/or subgroup. For example, a variance or other measure of how different in value a given check is from the average value of the checks in the subgroup and/or other features that provide an indication of how typical a given check is within a subgroup of checks may be calculated.

The correlation scores generated by the mutual information scoring algorithm may be used to select which subgroups of data records may be used as inputs for a machine learning algorithm. For example, subgroups having correlation scores that meet a predetermined threshold may be passed to a machine learning algorithm. In this example, to prevent the number of groupings and subgroups from being excessively large and to filter out irrelevant groupings/ groups, the combination of k-means clustering algorithms and mutual information scoring algorithms may retain and/ or use only those groupings and subgroups that provide a predetermined level of predictive relevance (e.g., correlation score) to a particular outcome (e.g., such as whether a particular check is fraudulent/counterfeit), while discarding and/or ignoring groupings/subgroups that do not reasonably predict the particular outcome. In some embodiments, a predetermined number of subgroups having the highest correlation scores may be passed to the machine learning algorithm. In some embodiments, a predetermined percentage of subgroups having the highest correlation scores may be passed to the machine learning algorithm. Other techniques for determining which subgroups are passed the machine learning algorithm are possible.

Using unsupervised clustering or partitioning techniques in conjunction with mutual information scoring algorithms, embodiments of the present invention may take a number of data records, such as checks, and automatically partition the data records into a number of subgroups with associated correlation scores. When using a vector quantization algorithm such as a k-means clustering algorithm, the algorithm may automatically generate a number and composition of groupings and subgroups based on the available categories of data.

The machine learning computing system 108 may receive the subgroups, information about the subgroup characteristics, the correlation score of each subgroup, additional information about checks within each subgroup, and/or other information from the k-means clustering algorithms and mutual information scoring algorithms, and use such information as inputs in a machine learning algorithm. Such inputs enable the machine learning algorithm to learn to more accurately predict whether a given check is likely to match a particular outcome, such as the check being fraudulent and/or counterfeit. This may enable one or more checks (and possibly other relevant information) to be passed into the trained machine learning algorithm to determine whether each check is likely to match a particular outcome. For example, the machine learning algorithm may determine which subgroup each check falls into within each grouping. The grouping/subgroup classification of each check, along with the correlation scores for each relevant subgroup, may be used as part of a prediction model of the machine learning algorithm to determine whether each received check is likely to be fraudulent and/or counterfeit.

Traditional methods of providing data to machine learning algorithms involved providing the algorithms with data processed by humans. However, given the limits of human time constraints and pattern recognition, such data was only minimally processed and would include a level of detail and granularity that would prove only marginally useful for machine learning. As such, traditional data input for machine learning algorithms included a lot of data that was not necessary or not as useful in training the machine learning model. This lower quality data, in turn, led to a training process that was slow and inefficient.

In contrast, the methods of this disclosure refines large sets of data through vector quantization—a means of refining data that is not practically performed by humans given the size of the data, and detail and scope of refinement. This improved method provides machine learning algorithms with an input that is more directly useful and applicable to the goal of the machine learning algorithm, thus streamlining the training process and improving the speed at which the machine learning model is trained with the machine learning algorithm. As such, the methods of this disclosure improves the technical field of training machine learning models by providing inputs to the machine learning algorithms that are more directly useful and applicable to the goal of the algorithm.

While discussed primarily in relation to determining whether checks are fraudulent and/or counterfeit, it will be appreciated that the techniques described herein may be used to generate predictions for other outcomes. For example, check data may be used to determine whether a user is likely to default on a loan and/or credit account. Additionally, the data records are not limited to checks and information related to checks. Rather, any type of data record may be used that may be relevant to predicting a particular outcome, which may be finance-related and/or may be applicable to a different application. The vector quantization algorithms may generate groupings and subgroups based on the categories of data present in any type of data record, and the mutual information scoring algorithms may be used to correlate the groupings/subgroups with the likelihood that the groupings/subgroups predict a particular outcome.

In some embodiments, additional sources of data, such as third party data sources may be used to supply data to the feature generation network 106. These third party data sources may supply data that may be relevant to predicting a particular outcome, but that may not be readily accessible by the one or more financial institutions 100. Such data may be used to generate the groupings/subgroups, as well as the correlation scores.

Figure 4:
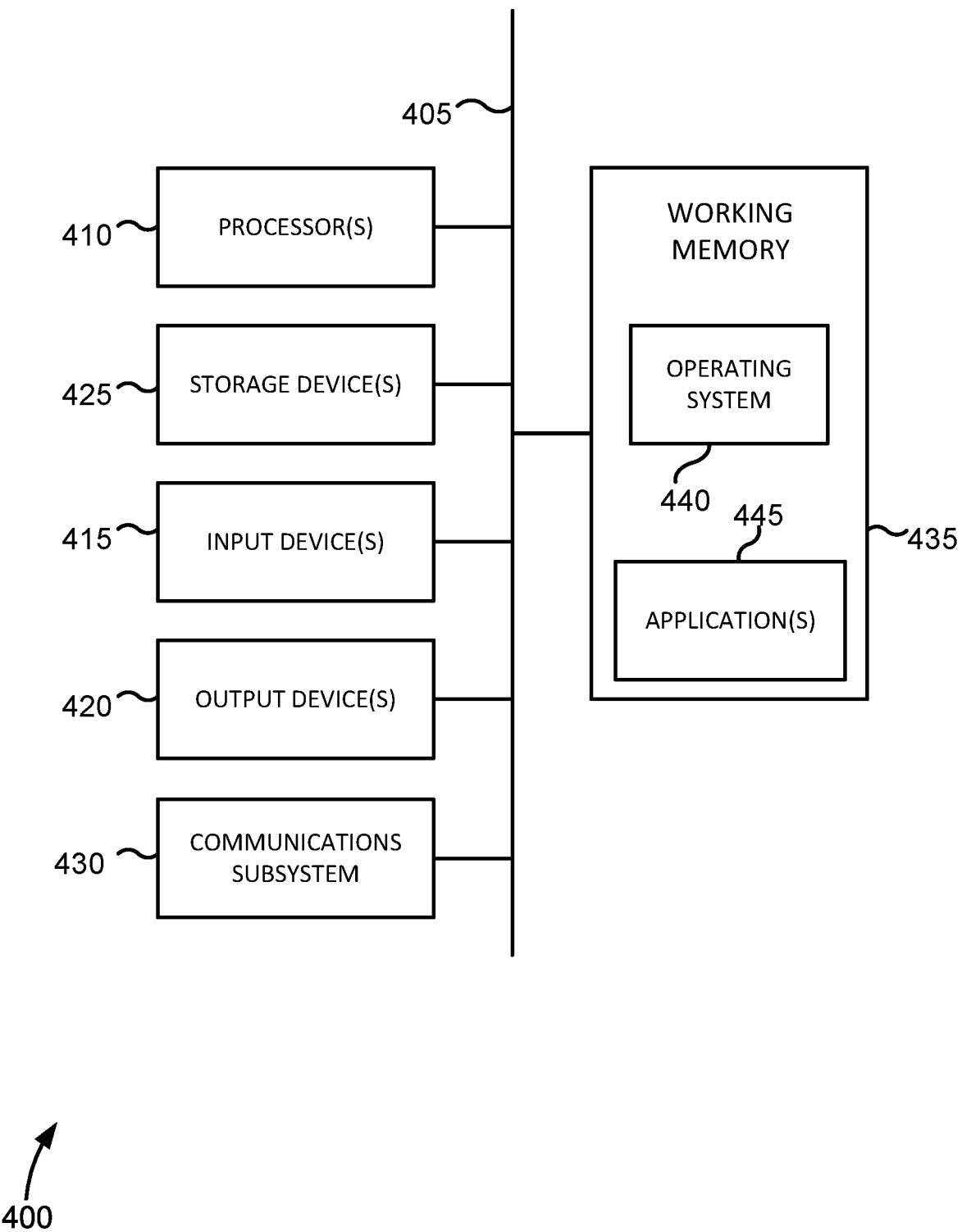
FIG. 4 is a block diagram of a computing system according to an embodiment of the present invention.

A computer system as illustrated in FIG. 4 may be incorporated as part of the previously described computerized devices. For example, computer system 400 can represent some of the components of computing devices, such as financial institutions 100, feature generation network 106, machine learning computing system 108, and/or other computing devices described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include: a processing unit 410, including, without limitation, one or more processors, such as one or more central processing units (CPUs), graphical processing units (GPUs), special-purpose processors (such as digital signal processing chips, graphics acceleration processors, and/or the like); one or more input devices 415, which can include, without limitation, a keyboard, a touchscreen, receiver, a motion sensor, a camera, a smartcard reader, a contactless media reader, and/or the like; and one or more output devices 420, which can include, without limitation, a display device, a speaker, a printer, a writing module, and/or the like.

The computer system 400 may further include (and/or be in communication with) one or more non-transitory storage devices 425. The one or more non-transitory storage devices 425 can comprise, without limitation, local and/or network accessible storage, and/or can include, without limitation, a disk drive, a drive array, an optical storage device, a solid-state storage device such as a random access memory ("RAM") and/or a read-only memory ("ROM"). The one or more non-transitory storage devices 425 can be programmable, flash-updateable and/or the like. Such storage devices may be configured to implement any appropriate data stores, including, without limitation, various file systems, database structures, and/or the like.

The computer system 400 might also include a communication interface 430, which can include, without limitation, a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network 104, to name one example), other computer systems, and/or any other devices described herein. Data transmitted across the networks 104 may be secured using encryption techniques, hypertext transfer protocol secure (HTTPS), secure sockets layer (SSL), transport layer security (TLS), and/or other security protocol. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code/instructions, such as one or more application programs 445 and/or a machine learning algorithm. Such code/instructions may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a feature generation engine (e.g., an engine used in the feature generation network 106) configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.)

Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and/or transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire, and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a non-transitory storage device 425 either before or after execution by the processing unit 410.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used.

For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A method of generating an input for a machine learning algorithm, using one or more processors, comprising:

collecting a plurality of data records, wherein each data record comprises a plurality of categories of data associated with a particular transaction;

executing an unsupervised vector quantization machine learning algorithm a plurality of times to partition the plurality of data records into a plurality of first machine learning inputs, wherein:

each execution of the unsupervised vector quantization machine learning algorithm generates a grouping of data comprising a plurality of subgroups;

each grouping of data comprises a unique combination of the one or more of the plurality of categories of data;

each of the plurality of subgroups within each grouping of data comprises one or more data records of the plurality of data records that have values that fall within a predetermined range for the unique combination of the one or more of the plurality of categories of data of the respective grouping of data; and each of the plurality of first machine learning inputs comprises one subgroup of the plurality of subgroups;

generating a second machine learning input for each grouping of data, wherein:

the second machine learning input comprises a correlation score that is indicative of whether a particular subgroup within the groupings of data is indicative of whether the particular transaction is fraudulent; and each correlation score is based at least partially on whether any transactions within a particular subgroup of data of a grouping of data associated with the correlation score are fraudulent; and providing, based on the correlation score, at least one of the plurality of first machine learning inputs and associated second machine learning input to a computing device storing the machine learning algorithm that identifies whether a particular data record is likely to be associated with a fraudulent transaction.

2. The method of generating an input for the machine learning algorithm of claim 1, wherein:

the at least one of the plurality of first machine learning inputs comprise at least one subgroup having a correlation score that meets or exceeds a predetermined threshold score.

3. The method of generating an input for the machine learning algorithm of claim 1, wherein:

the at least one of the plurality of first machine learning inputs comprise a predetermined number of at least one subgroup having at least one correlation score that is the highest.

4. The method of generating an input for the machine learning algorithm of claim 1, wherein:

the at least one of the plurality of first machine learning inputs comprise a predetermined percentage of at least one subgroup having at least one correlation score that is the highest.

5. The method of generating an input for the machine learning algorithm of claim 1, further comprising:

determining how different in value each data record of the plurality of data records is from an average data record within a particular subgroup associated with the data record.

6. The method of generating an input for the machine learning algorithm of claim 1, wherein:

generating the correlation score comprises passing the groupings of data into a mutual information scoring algorithm.

7. The method of generating an input for the machine learning algorithm of claim 1, wherein:

the unsupervised vector quantization machine learning algorithm comprises a k-means clustering algorithm.

8. The method of generating an input for the machine learning algorithm of claim 1, wherein:

collecting the plurality of data records includes collecting a plurality of checks from one or more financial institutions; and the correlation score is indicative of whether a particular subgroup of checks of the plurality of checks is indicative of a given outcome.

9. The method of generating an input for the machine learning algorithm of claim 8, wherein:

the correlation score for a particular group of checks of the plurality of checks is based at least partially on whether any checks within the particular subgroup of checks are fraudulent.

10. The method of generating an input for the machine learning algorithm of claim 1, further comprising:

receiving, by the computing device storing the machine learning algorithm, a specific data record;

determining, by the machine learning algorithm, which particular grouping and which particular subgrouping the specific data record falls within; and determining, by the machine learning algorithm, a likelihood that the specific data record is fraudulent.

11. A system, comprising:

one or more computing devices; and memory storing instructions, the instructions being executable by the one or more computing devices, wherein the one or more computing devices are configured to:

collect a plurality of data records, wherein each data record comprises a plurality of categories of data associated with a particular transaction;

executing an unsupervised vector quantization machine learning algorithm a plurality of times to partition the plurality of data records into a plurality of first machine learning inputs, wherein:

each execution of the unsupervised vector quantization machine learning algorithm generates a grouping of data comprising a plurality of subgroups;

each grouping of data comprises a unique combination of the one or more of the plurality of categories of data;

each of the plurality of subgroups within each grouping of data comprises one or more data records of the plurality of data records that have values that fall within a predetermined range for the unique combination of the one or more of the plurality of categories of data of the respective grouping of data; and each of the plurality of first machine learning inputs comprises one subgroup of the plurality of subgroups;

generating a second machine learning input for each grouping of data, wherein:

the second machine learning input comprises a correlation score that is indicative of whether a particular subgroup within the groupings of data is indicative of whether the particular transaction is fraudulent; and each correlation score is based at least partially on whether any transactions within a particular subgroup of data of a grouping of data associated with the correlation score are fraudulent; and providing, based on the correlation score, at least one of the plurality of first machine learning inputs and associated second machine learning input to a computing device storing a machine learning algorithm that identifies whether a particular data record is likely to be associated with a fraudulent transaction.

12. The system of claim 11, wherein:
the at least one of the plurality of first machine learning inputs comprise at least one subgroup having a correlation score that meets or exceeds a predetermined threshold score.

13. The system of claim 11, wherein:
generating the correlation score comprises passing the groupings of data into a mutual information scoring algorithm.

14. The system of claim 11, wherein:
the unsupervised vector quantization machine learning algorithm comprises a k-means clustering algorithm.

15. The system of claim 11, wherein:
collecting the plurality of data records includes collecting a plurality of checks from one or more financial institutions; and
the correlation score is indicative of whether a particular subgroup of checks of the plurality of checks is indicative of a given outcome.

16. The system of claim 15, wherein:
the correlation score for a particular grouping of checks of the plurality of checks is based at least partially on whether any checks within the particular subgroup of checks are fraudulent.

17. A non-transitory computing-device readable storage medium on which computing-device readable instructions of a program are stored, the instructions, when executed by one or more computing devices, causing the one or more computing devices to perform a method, comprising:
collecting a plurality of data records, wherein each data record comprises a plurality of categories of data associated with a particular transaction;
executing an unsupervised vector quantization machine learning algorithm a plurality of times to partition the plurality of data records into a plurality of first machine learning inputs, wherein:
each execution of the unsupervised vector quantization machine learning algorithm generates a grouping of data comprising a plurality of subgroups;
each grouping of data comprises a unique combination of the one or more of the plurality of categories of data;
each of the plurality of subgroups within each grouping of data comprises one or more data records of the plurality of data records that have values that fall within a predetermined range for the unique combination of the one or more of the plurality of categories of data of the respective grouping of data; and
each of the first plurality of machine learning inputs comprises one subgroup of the plurality of subgroups;

generating a second machine learning input for each grouping of data, wherein:
the second machine learning input comprises a correlation score that is indicative of whether a particular subgroup within the groupings of data is indicative of whether the particular transaction is fraudulent; and
each correlation score is based at least partially on whether any transactions within a particular subgroup of data of a grouping of data associated with the correlation score are fraudulent; and providing, based on the correlation score, at least one of the plurality of first machine learning inputs and associated second machine learning input to a computing device storing a machine learning algorithm that identifies whether a particular data record is likely to be associated with a fraudulent transaction.

18. The non-transitory computing-device readable storage medium of claim 17, wherein:
generating the correlation score comprises passing the groupings of data into a mutual information scoring algorithm.

19. The non-transitory computing-device readable storage medium of claim 17, wherein:
the unsupervised vector quantization machine learning algorithm comprises a k-means clustering algorithm.

20. The non-transitory computing-device readable storage medium of claim 17, wherein:
collecting the plurality of data records includes collecting a plurality of checks from one or more financial institutions; and
the correlation score is indicative of whether a particular subgroup of checks of the plurality of checks is indicative of a given outcome.

21. The non-transitory computing-device readable storage medium of claim 20, wherein:
the correlation score for a particular grouping of checks of the plurality of checks is based at least partially on whether any checks within the particular subgroup of checks are fraudulent.

* * * * *